J. G. FRIBERG.
ANTISKID DEVICE FOR VEHICLE WHEELS.
APPLICATION FILED AUG. 24, 1916.
1,237,770.
Patented Aug. 21, 1917.
2 SHEETS—SHEET 1.
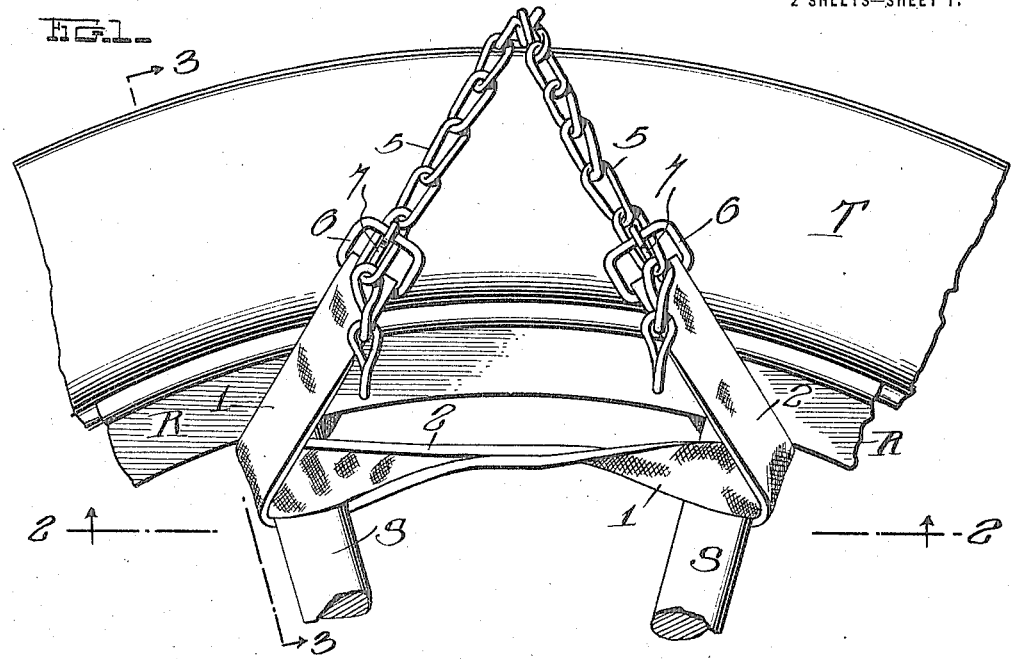
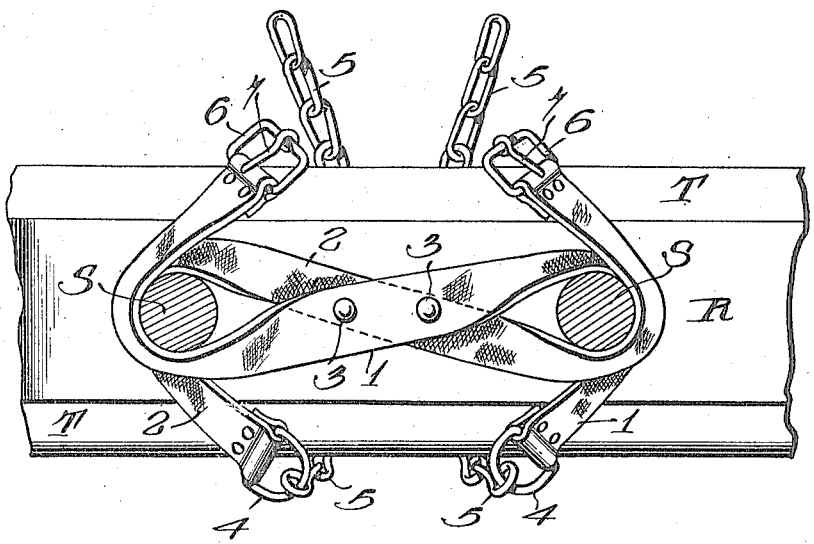
Witness
H. Woodard
Inventor
J. G. Friberg
By H. B. Willson &co
Attorneys J. G. FRIBERG.
ANTISKID DEVICE FOR VEHICLE WHEELS.
APPLICATION FILED AUG. 24, 1916.
1,237,770.
Patented Aug. 21, 1917.
2 SHEETS—SHEET 2.
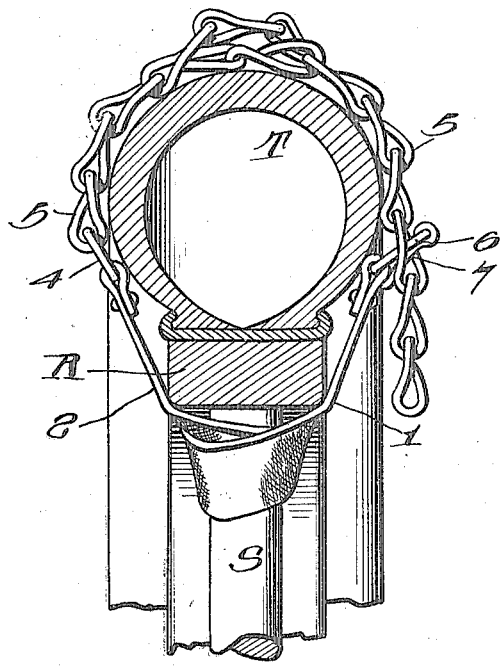
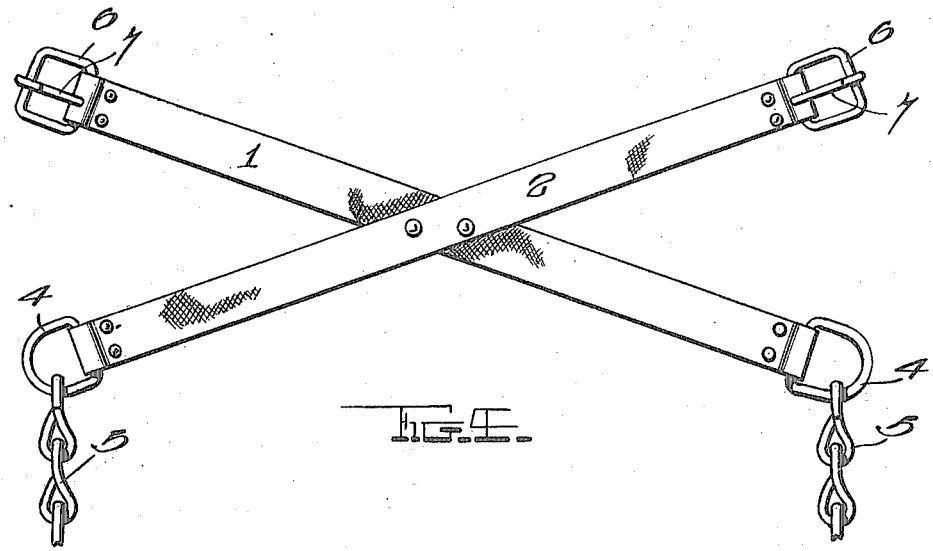
Witness
H. Woodard
Inventor
J. G. Friberg
By H. B. Willson & Co.
Attorneys

UNITED STATES PATENT OFFICE.

JOHN G. FRIBERG, OF MAIDEN ROCK, WISCONSIN.

ANTISKID DEVICE FOR VEHICLE-WHEELS.

1,237,770.  Specification of Letters Patent.  Patented Aug. 21, 1917.

Application filed August 24, 1916. Serial No. 116,677.

*To all whom it may concern:*

Be it known that I, JOHN G. FRIBERG, a citizen of the United States, residing at Maiden Rock, in the county of Pierce and State of Wisconsin, have invented certain new and useful Improvements in Antiskid Devices for Vehicle-Wheels; and I do declare the following to be a full, clear, and exact description of the invention, such as will enable others skilled in the art to which it appertains to make and use the same.

This invention relates to an anti-skid device for vehicle wheels, the object of the invention being to provide a device of this character which may be readily and easily attached and removed from the wheel.

Another object of the invention is to generally improve upon devices of this character by providing a device which will be simple, strong, durable and comparatively inexpensive in construction, efficient and reliable in operation, and well adapted to the purpose for which it is designed.

With these and numerous other objects in view, the invention consists of certain novel features of construction and the combination and arrangement of parts as will be hereinafter fully described and claimed.

In the accompanying drawings, forming part of this application and in which similar reference characters designate like parts throughout the several views:

Figure 1 is a side elevation of a portion of a vehicle wheel, showing a device constructed in accordance with this invention, applied thereto;

Fig. 2 is a horizontal section through the wheel taken on the plane of the line 2—2 of Fig. 1;

Fig. 3 is a transverse section of the wheel taken on the plane of the line 3—3 of Fig. 1; and Fig. 4 is a plan view of the device detached from the wheel, the anti-skid chains being shown broken away.

In the embodiment illustrated, the numerals 1 and 2 represent a pair of flexible straps which are securely attached to each other at a point substantially midway of their ends by one or more rivets 3. These straps 1 and 2 are preferably composed of heavy canvas yet it is to be understood that they may be made from leather or any other suitable material. As shown, these straps 1 and 2 cross each other at their points of connection at a comparatively small acute angle. The purpose of this will be hereinafter more fully described. Secured to the corresponding ends of the straps in any convenient manner are metal rings or eyes 4 to which one of the ends of a pair of anti-skid elements are connected, said elements being here shown in the form of anti-skid chains 5. The other ends of the straps are provided with buckles 6 which are very similar in construction to the ordinary strap buckle with the exception that they are attached to the straps in a reverse manner, that is, the pivoted tongues 7 of said buckles are disposed on the outer free ends of the same instead of on the ends which are connected to the straps. The purpose of this construction will also be hereinafter described.

The device is here shown applied to a vehicle wheel having a rim or felly R, a resilient tire T, and a plurality of spokes extending inwardly from the rim, the straps 1 and 2 being disposed on the inner side of the rim R and having their point of connection arranged between two adjacent spokes S. The straps are then carried around these adjacent spokes and are then crossed so that their opposite ends are disposed on opposite sides of the rim. By doing this, it will be seen that the eyes 4 will be disposed on one side of the rim, while the buckles 6 will be disposed on the other side of the same. The anti-skid chains 5 are then carried spirally around the tire T, the intermediate portions of the same crossing each other at a point substantially coincident with the tread of the tire, and having their outer ends inserted through the eyes of the buckles 6 and engaged with the tongues 7, which extend through one of the links of the chains. It is obvious that the device may be attached to wheels of various sizes, as the chains may be drawn around the tire and rim of the same as tight as may be desired, and then secured by passing the tongues of the buckles through any of the links of the same in the manner above described.

A device constructed as above may be easily and instantaneously applied to or removed from a vehicle wheel, even though the same is embedded in a mud hole. By having the anti-skid chains 5 crossing each other at a point opposite the tread of the tire a very effective gripping or anti-skidding action upon the surface of the ground over which the vehicle is passing is provided. The flexible straps 1 and 2 prevent injury to the generally highly polished spokes and rim of the wheel.

From the foregoing description, the construction and operation of the device will be readily understood without a more extended explanation.

As various changes in form, proportion, and in the minor details of construction may be resorted to without departing from the spirit of this invention, I do not wish to be limited to the construction herein shown and described other than that set forth in the appended claims.

I claim:

1. A device of the class described comprising a pair of flexible straps attached to each other at a point substantially midway of their ends and crossing each other at a comparatively small acute angle, anti-skid chains permanently connected to the corresponding ends of said straps, and means at the other ends of said straps for detachable connection to the other ends of said chains.

2. The combination with a vehicle wheel; of a pair of flexible straps disposed on the inner side of the rim of said wheel and crossing each other at a point substantially midway of their ends between two adjacent spokes of said wheel, said straps being then carried around said adjacent spokes, crossing each other again and having their opposite ends disposed on opposite sides of said rim; flexible anti-skid elements connected at one of their ends to the ends of said straps disposed on one side of said rim, and means for detachably and adjustably connecting the other ends of said elements to the ends of said straps disposed on the other side of said rim.

3. The combination with a vehicle wheel; of a pair of straps disposed on the inner side of the rim of said wheel and crossing each other at a point between two adjacent spokes of the latter and then engaging said adjacent spokes, and flexible anti-skid elements connected at their ends to the ends of said straps, said elements passing spirally around the tire of the wheel and crossing each other at the tread portion of the same.

In testimony whereof I have hereunto set my hand in the presence of two subscribing witnesses.

JOHN G. FRIBERG.

Witnesses:
R. H. CARPENTER,
F. W. CARPENTER.